US010267690B2

(12) United States Patent
Wu et al.

(10) Patent No.: US 10,267,690 B2
(45) Date of Patent: Apr. 23, 2019

(54) CAPACITIVE FORCE/TORQUE SENSOR

(71) Applicant: The Board of Trustees of the Leland Stanford Junior University, Palo Alto, CA (US)

(72) Inventors: Xin Alice Wu, Stanford, CA (US); John V Ulmen, Redwood City, CA (US); Mark R. Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 15/703,122

(22) Filed: Sep. 13, 2017

(65) Prior Publication Data

US 2018/0073942 A1 Mar. 15, 2018

Related U.S. Application Data

(60) Provisional application No. 62/393,768, filed on Sep. 13, 2016.

(51) Int. Cl.
  *G01L 1/14* (2006.01)
  *G01L 5/16* (2006.01)
  *B25J 13/08* (2006.01)

(52) U.S. Cl.
  CPC ............ *G01L 1/146* (2013.01); *G01L 1/142* (2013.01); *G01L 5/165* (2013.01); *B25J 13/082* (2013.01)

(58) Field of Classification Search
  CPC ......... G01L 1/146; G01L 5/165; B25J 13/082
  (Continued)

(56) References Cited

U.S. PATENT DOCUMENTS

2010/0162832 A1* 7/2010 Brauers ................. A61B 5/103
  73/862.626
2012/0029819 A1* 2/2012 Mastrangelo ........ G01C 22/006
  701/472

(Continued)

FOREIGN PATENT DOCUMENTS

JP 2012247297 A * 12/2012

OTHER PUBLICATIONS

Translation of JP 2012247297 A.*
Theory of Dielectric Elastomers, Acta Mechanica Solida Sinica, vol. 23, No. 6, Dec. 2010.

*Primary Examiner* — Nathaniel T Woodward
(74) *Attorney, Agent, or Firm* — Lumen Patent Firm (57) ABSTRACT

A capacitive force sensor is provided that includes a first support layer and a second support layer, a dielectric layer disposed between the first support layer and the second support layer, where the dielectric layer is a non-conductive elastomer that is incompressible in the a normal direction and deflects in a shear direction, a layer of parallel conductive traces disposed between and bonded to the dielectric layer and the first support layer, and a conductive layer of parallel shear channel traces having at least two distinct channels disposed between and bonded to the dielectric layer and the second support layer, where the parallel conductive traces and the parallel shear channel traces are locally parallel to each other and provide capacitive shear force measurement sensitivity while rejecting normal forces, where the normal force measurement is decoupled from the shear force measurement.

5 Claims, 4 Drawing Sheets

(58) Field of Classification Search
USPC .......................................................... 73/780
See application file for complete search history.

(56) References Cited

U.S. PATENT DOCUMENTS

| | | | |
|---|---|---|---|
| 2013/0093437 A1* | 4/2013 | Koo | G01R 27/2605 |
| | | | 324/660 |
| 2014/0174204 A1* | 6/2014 | Chen | G01L 1/142 |
| | | | 73/862.626 |
| 2015/0292969 A1* | 10/2015 | Choi | G01L 5/165 |
| | | | 73/862.041 |
| 2017/0086704 A1* | 3/2017 | Gwin | A61B 5/742 |
| 2017/0176266 A1* | 6/2017 | Mathieu | G01L 1/142 |

* cited by examiner

Quad Taxels

CAPACITIVE FORCE/TORQUE SENSOR

CROSS-REFERENCE TO RELATED APPLICATIONS

This application claims priority from U.S. Provisional Patent Application 62/393,768 filed Sep. 13, 2016, which is incorporated herein by reference.

STATEMENT OF GOVERNMENT SPONSORED SUPPORT

This invention was made with Government support under contract W911NF-08-2-0004 awarded by the U.S. Army Research Laboratory. The Government has certain rights in the invention.

FIELD OF THE INVENTION

The invention relates generally to capacitive force sensors. More particularly, the invention relates to a capacitive force sensor configured to sense both normal and shear forces, while the force measurement is decoupled from the shear measurement.

BACKGROUND OF THE INVENTION

Following the discovery in 2000 of the mechanisms underlying gecko adhesion, synthetic fibrillar dry adhesion has been an active research topic with over 100 publications on adhesive fabrication, modeling, etc. During this time, the number of robots that employ dry adhesion has been comparatively small, although several climbing, flying and space gripping examples are reported.

One difficulty with applying gecko-inspired dry adhesion in the real world is that it is difficult for the robot to know when it has achieved a reliable grip, especially on surfaces that may have defects or contamination. In contrast, the gecko has numerous mechanoreceptors in its toes, so it always knows whether it is attaching reliably. Indeed, a lack of adequate attachment at the forelimbs triggers automatic tail reflexes to prevent falling. Giving robots a similar ability to sense attachment quality will allow them to climb more reliably. Measuring the tail forces for a climbing robot can provide an estimate of adhesive forces at the feet, which aids climbing.

The strength of adhesion depends on the uniformity of contact between the adhesive and a surface. If a robot is climbing a window, it is often apparent by looking through the glass from the opposite side whether the robot's foot pads have attached properly; the color or brightness of firmly attached regions will be different from those of regions that are not. Unfortunately, this solution will not work for onboard sensing, as the robot only sees the window from one side. For testing of large adhesive tiles, a solution using optical emitters and detectors covered with a clear silicone layer followed by clear silicone fibrillar structures can determine what area is making contact.

In other work, an optical sensor with high spatial resolution, using frustrated total internal reflection, measures the positive and negative pressure distributions achieved by live geckos. However, this design is not practical for packaging into the foot of a small climbing or flying robot. It also does not suffice to measure the overall normal and tangential force at a robot foot. The reason is that these forces will increase up to the point of failure, with no warning of premature failure if the contact conditions are poor. Instead, one should measure a distribution of positive and negative pressures, as well as shear tractions, at each adhesive pad. To be practical, the sensor at each foot should also be small, thin, robust and lightweight, particularly for applications in micro air vehicles (MAVs).

What is needed is a sensor, which decouples normal and shear measurements and provides high sensitivity to shear loads.

SUMMARY OF THE INVENTION

To address the needs in the art, a capacitive force sensor is provided that includes a first support layer and a second support layer, a dielectric layer disposed between the first support layer and the second support layer, where the dielectric layer is a non-conductive elastomer that is incompressible in the a normal direction and deflects in a shear direction, a layer of parallel conductive traces disposed between and bonded to the dielectric layer and the first support layer, and a conductive layer of parallel shear channel traces having at least two distinct channels disposed between and bonded to the dielectric layer and the second support layer, where the parallel conductive traces and the parallel shear channel traces are locally parallel to each other and provide capacitive shear force measurement sensitivity while rejecting normal forces, where the normal force measurement is decoupled from the shear force measurement.

According to one aspect of the invention, the parallel conductive traces and the parallel shear channel traces are parallel across the dielectric layer for providing shear force sensitivity in a single direction.

In another aspect the invention further includes a first region and a second region, where the parallel conductive traces and the parallel shear channel traces in the first region are orthogonal to the parallel conductive traces and the parallel shear channel traces in the second region, where the parallel shear channel traces and the parallel conductive traces in the first region and the second region are configured to provide shear force sensitivity in two orthogonal directions.

In yet another aspect, the invention further includes four quadrants, where the parallel conductive traces and the parallel shear channel traces in a first the quadrant and a second the quadrant are orthogonal to the parallel conductive traces and the parallel shear channel traces in a third the quadrant and a fourth the quadrant, where the parallel shear channel traces and the parallel conductive traces in the four quadrants are configured to provide shear force sensitivity in two orthogonal directions and torsion sensitivity about a single axis.

According to another aspect, the invention further includes a third support layer, a second dielectric layer, where the second dielectric layer is disposed between the second support layer and the third support layer, where the second dielectric layer includes a deformable and non-conductive material forming a patterned structure having gaps, a conductive ground layer disposed between and bonded to the third support layer and the second dielectric layer, and a conductive layer of normal taxel traces having two distinct channels disposed between and bonded to the second dielectric layer and the second support layer, where the normal taxel traces are configured to provide capacitive force measurements having sensitivity in a normal direction for measuring a force component (Fz) and two moment and torque components (Mx, My).

DETAILED DESCRIPTION

A capacitive force sensor that mechanically decouples normal and shear forces is provided herein. The current invention can not only achieve high sensitivity in normal and shear force directions but also provides a greater design freedom in the spatial placement and distribution of different sensing elements. This allows for the creation of a thin and robust 6 degree-of-freedom (DOF) capacitive force sensor capable of sensing forces in 3 directions (x, y, z) and moments about 3 directions (x, y, z). The present invention provides a capacitive tactile sensor that presents a good solution to the problems in existing sensors, as it offers high performance at a low cost. The sensor design makes it robust to external impacts and force overloads offer a big advantage over existing force/torque sensing solutions.

Capacitance between parallel plates is given by $$C = \frac{\varepsilon A}{d}, \quad (1)$$

where $\varepsilon$ is the dielectric constant and A and d are the plate area and separation respectively. For a parallel plate capacitor with an elastic dielectric material, it is seen that the capacitance is sensitive to applied forces in both normal and shear: a normal force changes plate distance, and a shear force changes plate area.

To achieve high performance in the normal force direction, in one embodiment, a sparse structure of silicone rubber is used as the dielectric to reduce stiffness and hysteresis while tuning force range and sensitivity. This creates a combined rubber and air gap between the two sensing plates.

For this exemplary embodiment, the dielectric spring support structure is a thin-walled grid of silicone rubber. This embodiment incorporates the sensitivity equation of the normal force sensor:

$$\left.\frac{\partial C_n}{\partial F_n}\right|_{F_s=0} = \frac{\varepsilon}{\rho_A E d_0}. \quad (2)$$

Turning now to an embodiment for a thin capacitive shear force sensor with normal force rejection. When elastic materials become thin, the effective compressive stiffness increases dramatically without affecting shear stiffness. Using this property one can achieve a high mechanical decoupling between the shear and normal channels by making the shear dielectric layer thin. Furthermore, by using thin "finger" elements in the shear sensor, one can improve the signal to noise ratio as well as the sensitivity.

Figure 2:
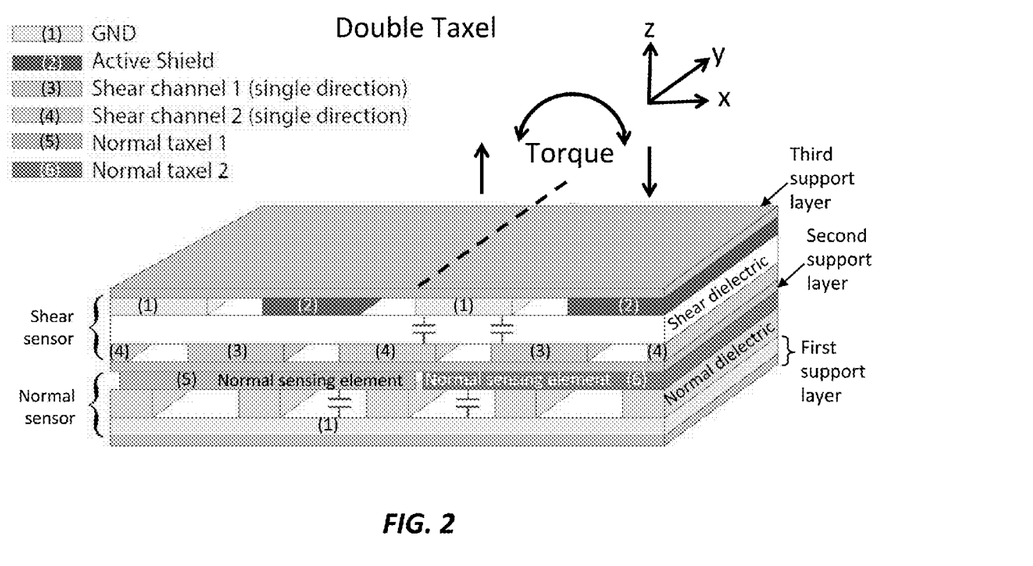
FIG. 2 shows a cross-section of a double-taxel sensor with design parameters for decoupled shear force sensing and decoupled normal force sensing, and configured for torque sensing about the y-axis, according to one embodiment of the invention.
Figure 3A:
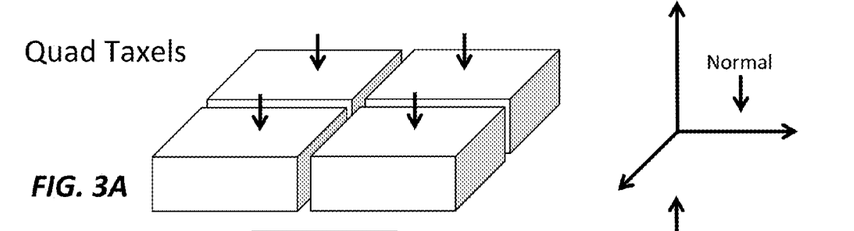
FIGS. 3A-3F show a quad-taxel sensor with design parameters for 6 degrees-of-freedom having decoupled shear force sensing and decoupled normal force sensing, according to one embodiment of the invention.
Figure 3B:
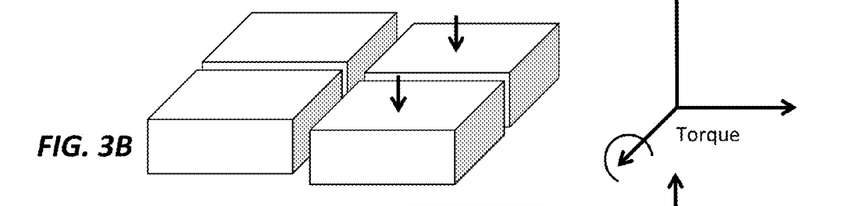
Figure 3C:
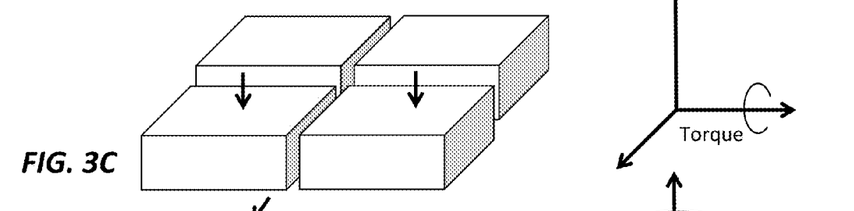
Figure 3D:
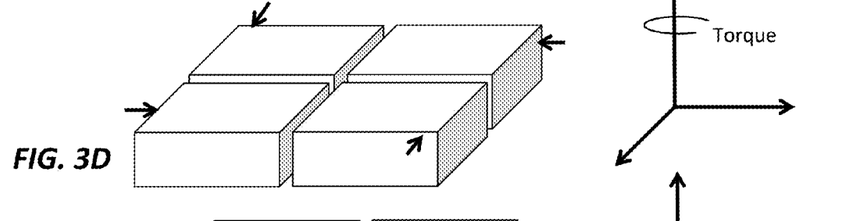
Figures 3E, 3F:
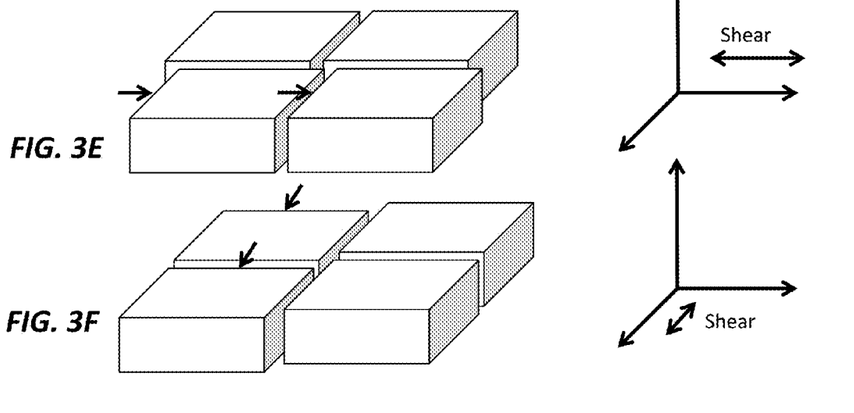

As shown in one embodiment presented in FIG. 2, the shear sensor includes of a pair of alternating thin copper traces (finger structures) opposite alternating traces of ground and active shield. The active shield is driven at the same frequency and voltage as the excitation signal applied to the sensing elements during capacitive-to-digital conversion. An offset overlap between the two sets of fingers produce two parallel plate capacitors between neighboring sensing elements and ground. An external shear force produces a differential signal in the sensing elements. The differential signal measurement improves the decoupling of normal from shear force by rejecting common mode variations in the shear channel.

In order to determine the behavior of the sensor, expressions are derived for the sensor sensitivities from shear and normal force to capacitance in the shear sensor layer. These expressions allow one to verify that the sensor effectively decouples forces, and allows us to improve the sensor design.

Presented herein is the derivation for the sensitivity to a shear force in the shear sensing layer. The shear modulus of the sensor is the ratio of shear stress to shear strain. Using the shear layer area $A_s$ to calculate stress and the initial separation $d_0$ to calculate strain, one can solve for the shear layer displacement in terms of applied forces and geometry:

$$\delta_x = \frac{F_s d_0}{A_s G} \quad (3)$$

Note that the shear displacement is linear in shear stress. The area of overlap between the shear sensing elements (shown in FIG. 2) is $$A = nL(x_0 - \delta_x) \quad (4)$$

Combining 1, 3, and 4, we write the capacitance as a function of shear force:

$$C_s = \frac{\varepsilon n L \left( x_0 - \frac{F_s d_0}{A_s G} \right)}{d_0} \quad (5)$$

Differentiating with respect to the shear force Fs yields the shear sensitivity $$\frac{\partial C_s}{\partial F_s} = -\frac{\varepsilon n L}{A_s G} \quad (6)$$

Turning now to deriving the sensitivity of the shear sensing layer to applied normal forces. The aspect ratio of the dielectric is defined as the distance between plates over half the width.

$$\eta = \frac{2d_0}{s} \quad (7)$$

Assuming that the dielectric is incompressible allows one to find the effective Young's modulus as:

$$E_e = \frac{4}{3}E(1+\eta^{-2}) \quad (8)$$
$$= \frac{E}{3d_0^2}(4d_0^2 + s^2)$$

Using the definitions of stress and strain, this time in the normal direction, one can derive an expression for normal displacement as a function of applied force:

$$\delta_z = \frac{F_n d_0}{A_s E_e} \quad (9)$$

In order to determine the sensitivity to normal force, one assumes that the shear displacement is zero in Eq. 4. Using this, and combining Eqns. 4, 9, and 10, it can be shown that the capacitance in the shear sensing layer is given by:

$$C_s = \frac{\varepsilon n L x_0 A_s E(4d_0^2 + s^2)}{A_s E(4d_0^2 + s^2)d_0 - 3F_n d_0^3} \quad (10)$$

Differentiating with respect to $F_n$, one can find the shear sensitivity to normal force:

$$\frac{\partial C_s}{\partial F_n} = \frac{3d_0^3 \varepsilon n L x A_s E(4d_0^2 + s^2)}{(A_s E(4d_0^2 + s^2)d_0 - 3F_n d_0^3)^2} \quad (11)$$

For the cross-axis sensitivity, it is desirable for the shear sensor to respond well to shear, but not to normal forces. That is, one can require the ratio of sensitivities to shear and normal force to be large:

$$\frac{\partial C_s}{\partial F_s} \gg \frac{\partial C_s}{\partial F_n} \quad (12)$$

Substituting expressions from Eqns. 6 and 12, shows that the ratio of these sensitivities is $$\frac{\frac{\partial C_s}{\partial F_s}}{\frac{\partial C_s}{\partial F_n}} = \frac{E(4d_0^2 + s^2)}{3Gd_0 x_0} = \frac{4d_0}{x_0} + \frac{s^2}{d_0 x_0} \quad (13)$$

where $G=E/3$ for an elastomer. The first term is about 4, since $d_0 \approx x_0$; the second term is large, since $s^2 \gg d_0 x_0$. This means that the shear sensor design successfully decouples normal and shear force response mechanically.

In another embodiment, the tactile sensor includes 3 layers of 0.79 mm thick printed circuit board (FR-4) sandwiching two layers of silicone dielectric. The bottom PCB layer is a grounding plane for the normal force sensing pads. This plane is large enough to ensure that under shear loads the normal taxels never move past the boundaries of the ground plane, thus preventing shear forces from coupling into normal force measurement. The middle PCB layer has pads on one side for normal force sensing and shear force sensing on the other. Active shielding planes and trace routing are embedded in internal layers to eliminate stray capacitance. The top PCB layer of the sensor consists of alternating traces of active shield and ground signals for shear force sensing.

According to exemplary embodiments. the dielectric for the normal layer is a thin-walled (254 μm wide, 127 μm tall) silicone rubber (TAP® Silicone RTV, E=840 kPa) grid with a fill ratio→A of 13%. The dielectric for the shear layer includes a uniform sheet of silicone rubber (Smooth-On Ecoflex® 00-50, G=100 kPa) 127 μm thick. The silicone is cast onto the PCBs which have been treated with silicone primer (Dow Corning® PR-1200).

For sensing electronics and shielding, a 16-bit CDC (Analog Devices AD7147) is used to sample the 8 taxels (for example) in normal and shear at 163 Hz. The same chip also provides the active shield signal critical to shear force sensing. The normal force sensing elements include 4 pads (136 $mm^2$ each) arranged in a 2×2 grid, providing a spatially distributed force measurement. Each axis of shear force is measured by a pair of alternating parallel traces (w=0.305 mm). The overlap width $x_0$ is 76.2 μm. Sensor data were acquired via I2C through a microcontroller (Microchip PIC24F04KA201) and sent to a PC via USB.

The present capacitive force sensing technology can be easily integrated into existing smart-phones, user interfaces (such as computer mice, keyboards, etc), and gaming controllers, allowing companies to bring a greater variety of user experience to their customers through force sensing and tactile feedback. Another application for this capacitive tactile sensing technology is in prosthesis, especially in hands. Currently, many prosthetic hands are not equipped with tactile sensors due to cost and the lack of robust sensing solutions. The lack of such sensing technology prevents prosthetic hands from providing tactile feedback to its users, leading to a very mentally taxing experience whenever a user needs to perform dexterous manipulation tasks. The capacitive tactile sensor presented here solves this problem in that it can be easily integrated into existing prosthetic hands, thereby providing an opportunity to create touch feedback for users of upper-limb prosthetic devices. For lower limb prosthesis, the capacitive tactile sensor presented provides a way of monitoring prosthetic socket interface loads, which can reduce inflammation due to improper stress loads and further disabilities.

In addition to other innovations, embodiments may include one or more of the following innovative features: 1. The mechanical design that decouples normal and shear force signals. 2. The PCB interlaced trace design that enables linearly scalable, high sensitivity performance in the shear force-sensing axis. 3. The PCB trace design that allows the sensor to measure both shear forces and torque about a central axis. 4. The quadrangle PCB trace design for low-profile torque sensing.

Advantages over Force Sensitive Resistors (FSR): FSRs are one of the most dominant forms of force transducers on the market today. The current invention improves upon FSRs in a variety of ways. Most importantly, the present sensor demonstrates very low hysteresis compared to a FSR. Once fully constructed, the sensor is very robust and the sensor material is not as easily damageable due to external cyclic loading compared to a FSR. The sensor also uses less power compared to off-the-shelf FSR technology. Advantages over piezoresistive sensors: Most commercial force torque sensors utilizes piezoresistive sensing technology such as strain gauges, which presents a few well known usage issues. First, strain gauges produce small signals for changes in force and requires external signal amplifier circuits. These circuits are often susceptible to E/M noise which the present capacitive sensor is less affected by. Furthermore, the fragile electrical junctions on strain gauges make these force torque sensors susceptible to damage from impacts and overload failure.

Advantages piezoelectric sensors: Piezoelectric sensors can be made to be extremely lightweight, however, they are mainly used in dynamic force measurement applications and are not good candidates for static force measurements. These sensors also requires complex external charge amplification circuits which are also highly susceptible to E/M noise. The present capacitive tactile sensor can be implemented to be as lightweight as existing piezoelectric sensors and does not require external signal amplification and processing circuits.

Figure 1:
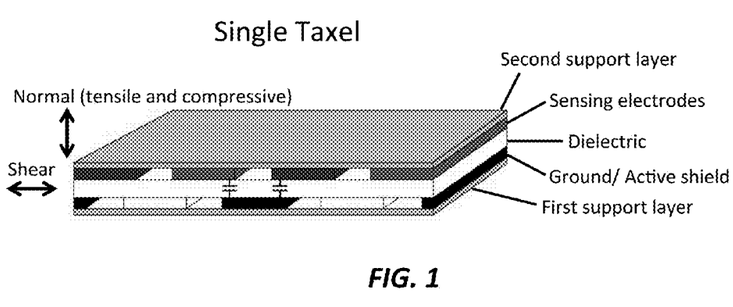
FIG. 1 shows a cross-section of a single-taxel sensor with design parameters for decoupled shear force sensing and decoupled normal force sensing, according to one embodiment of the invention.

In one aspect, the invention provides a capacitive force sensor for sensing forces that are normal to the sensor surface. This embodiment of the capacitive force sensor includes a first support layer and a second support layer, with a dielectric layer sandwiched between the first support layer and the second support layer. Here, the dielectric layer is composed of a non-conductive elastomer that is incompressible in the normal (tensile and compressive) direction but able to deflect in the shear direction, as shown in FIG. 1.

In another aspect, the invention provides a shear force sensor for sensing forces that are parallel and/or in-plane with the sensor surface, such as translating or torque forces. In this aspect a layer of parallel conductive traces are sandwiched between and bonded to the dielectric layer and the first support layer, and a conductive layer of parallel shear channel traces, having at least two distinct channels are sandwiched between and bonded to the dielectric layer and the second support layer. Here, the parallel conductive traces and the parallel shear channel traces are locally parallel to each other and provide capacitive shear force measurement sensitivity while rejecting normal forces.

The first support layer and the second support layer may be composed, for example, of FR-4, polyimide/kapton, or a conductive material providing EM shielding. The dielectric layer may be composed, for example, of a solid fill silicone, foam, or urethane. The layer of parallel conductive traces may be composed, for example, of copper, conductive fabric, or wire meshes.

In one embodiment of the capacitive force sensor, the parallel conductive traces and the parallel shear channel traces are parallel throughout the sensor or dielectric material, providing shear force sensitivity in a single direction.

Figure 5A:
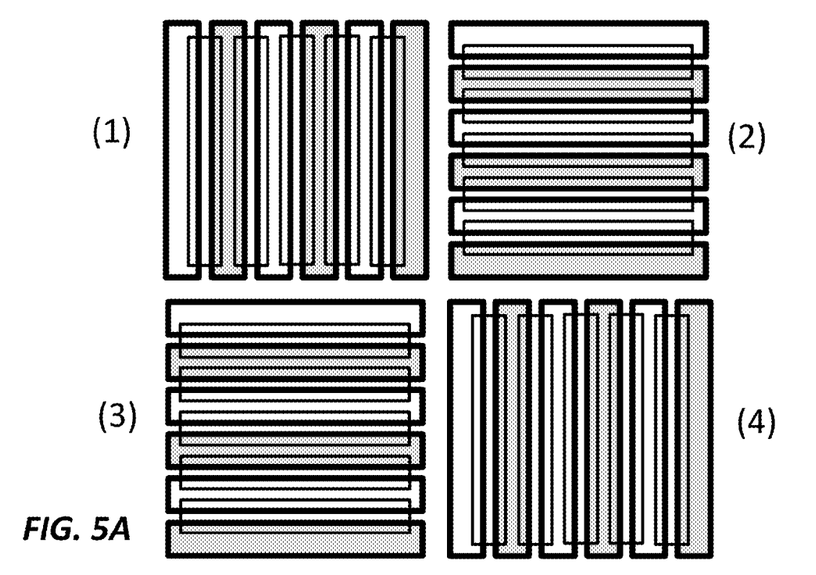
FIGS. 5A-5B show a schematic drawing of quad-taxel sensor configured for shear sensing, according to one embodiment of the invention.
Figure 5B:
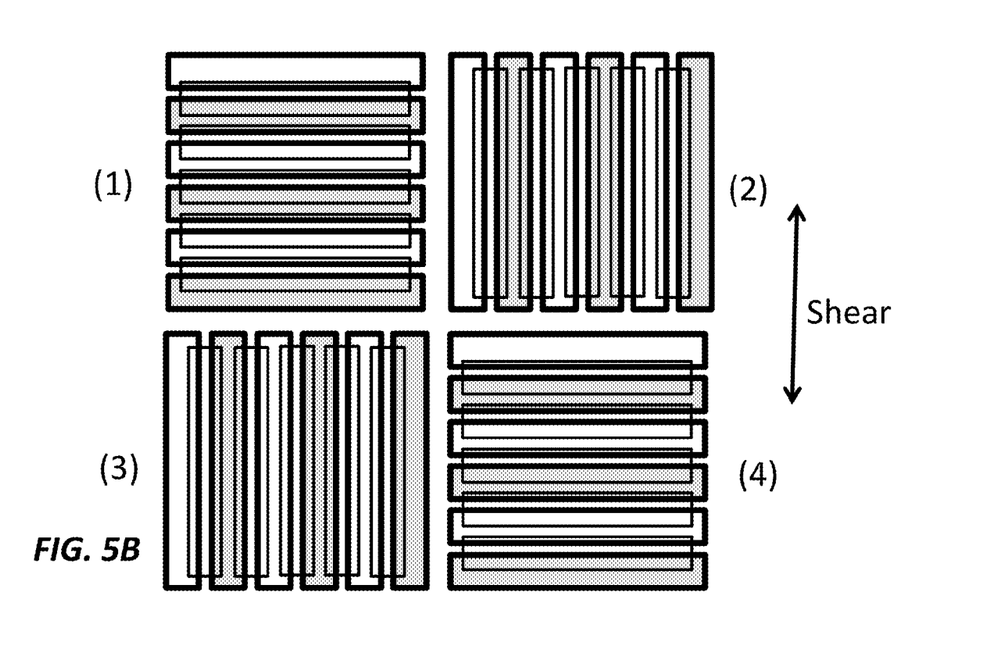

In another embodiment, the capacitive force sensor has a first region and second region, wherein the parallel conductive traces and the parallel shear channel traces in the first region are orthogonal to the parallel conductive traces and the parallel shear channel traces in the second region, providing shear force sensitivity in two orthogonal directions, as shown in FIGS. 5A-5B.

Figure 4A:
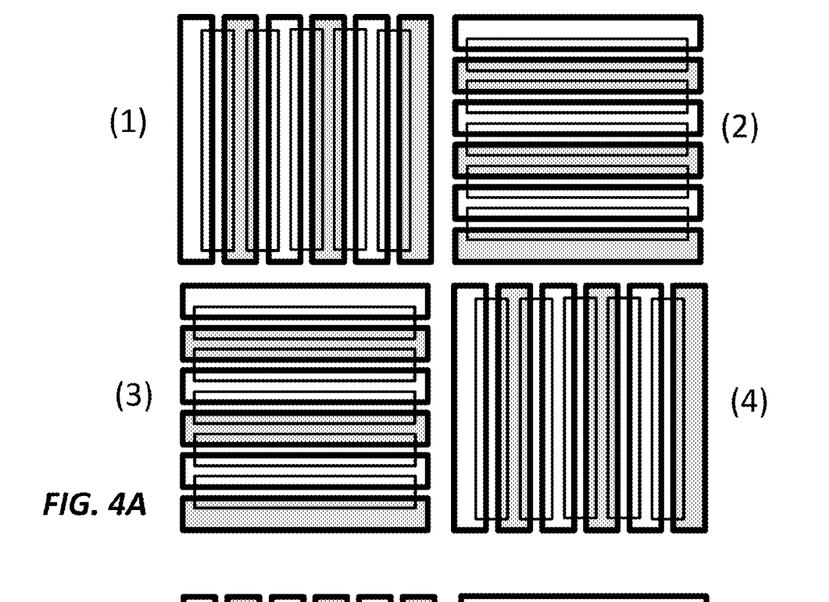
FIGS. 4A-4B show a schematic drawing of quad-taxel sensor configured for torque sensing, according to one embodiment of the invention.
Figure 4B:
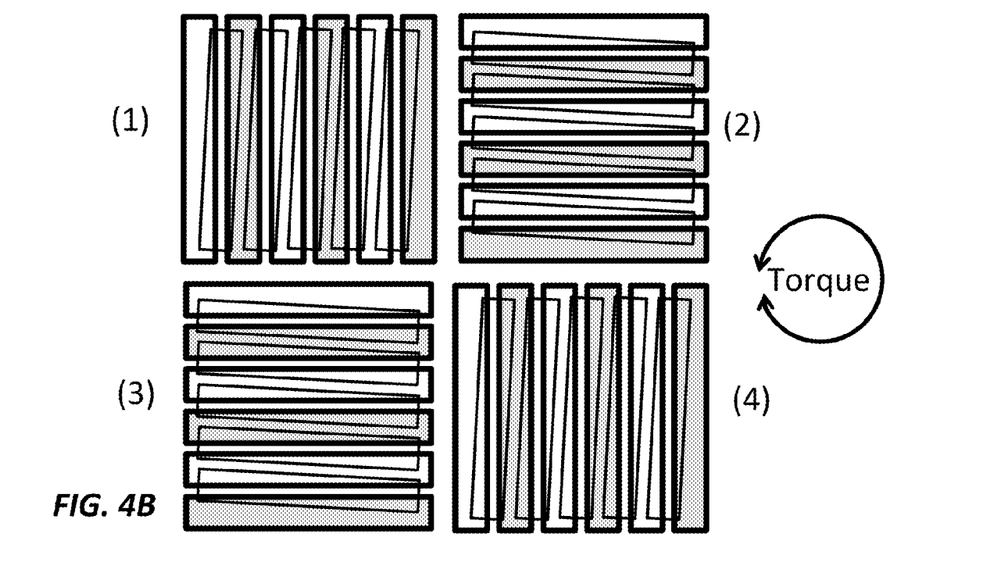

In another embodiment, the capacitive force sensor has four quadrants, wherein the parallel conductive traces and the parallel shear channel traces in a first pair of the quadrants are orthogonal to the parallel conductive traces and the parallel shear channel traces in a second pair of the quadrants, providing shear force sensitivity in two orthogonal directions and torsion sensitivity about a single axis, as shown in FIGS. 4A-4B.

In another embodiment, FIG. 2 shows the capacitive force sensor including a third support layer, a second dielectric layer, sandwiched between second and third support layers, composed of a deformable and non-conductive material forming a patterned structure having gaps. A conductive ground layer is shown sandwiched between and bonded to the third support layer and the second dielectric layer; and a conductive layer of normal taxel traces, having two distinct channels, sandwiched between and bonded to the second dielectric layer and the second support layer, where the normal taxel traces provide capacitive force measurement sensitivity in the normal (tensile and compressive) direction for measuring 1 force component (Fz) and 2 moment/torque component (Tx, Ty).

According to the current embodiment, the second dielectric layer may be composed, for example, of a silicone rubber, foam, urethane, or non-conductive elastomeric material. The second dielectric layer in some embodiments forms a sparsely patterned structure.

In another aspect, the invention provides a capacitive force sensor having first support layer and a second support layer, a dielectric layer sandwiched between the first support layer and the second support layer that is composed of a non-conductive elastomer incompressible in the normal (tensile and compressive) direction but able to deflect in the shear direction. A layer of conductive plates is shown sandwiched between and bonded to the dielectric layer and the first support layer, where the layer of conductive plates has a discrete rotational symmetry. Further shown is a conductive layer of shear channel traces, having four distinct channels, sandwiched between and bonded to the dielectric layer and the second support layer, where the conductive layer of shear channel traces has a discrete rotational symmetry, where the parallel conductive traces and the parallel shear channel traces provide capacitive torsional force measurement sensitivity while rejecting shear forces and normal forces.

In one embodiment of the invention, a multi-axis capacitive tactile sensor measures all six components of force and torque, as shown in FIGS. 3A-3F. The system includes a transducer with various high-speed digital data output options (SPI, I2C, UART). This embodiment of the invention is a 6 degree-of-freedom capacitive force torque sensor capable of measuring forces in 3-directions (x, y, z) and moments about 3-axis (x, y, z). The sensor was designed to solve a major need in robotics for low cost, high performance force torque sensing. Currently, no existing capacitive force sensing technology demonstrates comparable sensitivity and dynamic range in multiple axis. The current embodiment is able to decouple normal, shear, and torsional sensing to create a sensor that is equally sensitive in the normal and shear direction. When implemented, the sensor is highly robust, an improvement over strain-gauge based sensing methods that are sensitive to temperature and force loads, and can be easily integrated into any system that may need force sensing. Furthermore, the sensor design can measure tensile normal forces as well as compressive normal forces, a significant improvement over comparable technology such as force sensing resistors (FSRs).

The sensor shown in FIG. 2 has 3 layers of conductive copper traces sandwiching silicone dielectric layers, and is adapted to the 4-taxel embodiment of FIGS. 3A-3F. The copper layers can include flexible or rigid PCB boards or any other type of conductive material (e.g. conductive fabric, wire meshes). The dielectric layer used for normal force measurements can include any type of silicone rubber, foam, or any other type of material that is deformable and non-conductive. The dielectric layer used for shear force measurements can be any type of non-conductive elastomer. The sensor is designed to mechanically decouple normal and shear forces by using a patterned layer of silicone material in the first PCB sandwich layer to control force measurement sensitivity in the normal (tensile and compressive) direction which measures 1 force component (Fz) and 2 moment/torque component (Tx, Ty). This first bonded layer is then bonded to a second PCB through a layer of solid fill silicone, which is incompressible in the normal direction while still able to deflect in the shear direction. This second sandwich layer is designed to measure 2 shear force directions (Fz, Fy), and 1 moment/torque component (Tz).

The sensor is dynamic (up to 100 Hz, dependent on the choice of dielectric material), highly sensitive, robust, and easily customizable, in both force range and form factor (from large tactile arrays to ultra-thin FPCB), to suit a wide range of applications including wireless force sensing. The sensor can be used either a stand-alone force/torque sensor or integrated into existing hardware for closed-loop feedback control applications. Using commercially available PCB manufacturing processes, the sensor can be embodied in a variety of formats on both flexible and rigid backings. The design is scalable for a large range of physical sizes to fit anything between a 2×2 mm surgical manipulator tool-tip to large scale tactile skins for robots.

This force sensing technology can be applied in a wide variety of industries: robotics, automation, medical, and consumer products. For example, the sensor can be integrated into a robotic hand for dexterous manipulation in a manufacturing setting. It can also be integrated into a consumer product such as a phone, or a user input device (such as a mouse, remote control, or game controller). The sensor is also a good candidate for portable force/torque sensing since it is extremely lightweight compared to most commercial force torque sensors. In addition, compared to existing commercial products that need bulky, fragile, custom signal amplifiers and processors, the present sensor includes off the shelf components that can be integrated into a small (1×1 inch or smaller) package for wireless force sensing.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example a capacitive rotary encoder, described in patent application No. US20130093439A1 is incorporated by reference herein in its entirety, is adopted here by bonding the two layers of PCB together with again a thin layer of elastomer to create a capacitive torsion sensor. In this implementation the sensor is able to resist both normal forces (due to the mechanical design choice of using a thin layer of elastomer between two stiff support members) and shear forces, due to symmetry in the electrode design.

All such variations are considered to be within the scope and spirit of the present invention as defined by the following claims and their legal equivalents.

What is claimed:

1. A capacitive force sensor comprising:
    a) a first support layer and a second support layer;
    b) a dielectric layer disposed between said first support layer and said second support layer, wherein said dielectric layer comprises a non-conductive elastomer, wherein said dielectric layer comprises a thickness-to-area ratio that is configured to increase an effective compressive stiffness without affecting a shear stiffness, wherein said dielectric layer is effectively incompressible in a normal direction and deflects in a shear direction, wherein a normal force response is mechanically decoupled from a shear force response;
    c) a layer of parallel conductive traces disposed between and bonded to said dielectric layer and said first support layer; and
    d) a conductive layer of parallel and separate shear channel traces having at least two distinct channels disposed between and bonded to said dielectric layer and said second support layer; wherein said parallel conductive traces and said parallel shear channel traces are locally parallel to each other and provide a capacitive shear force measurement sensitivity while rejecting a normal forces force measurement.

2. The capacitive force sensor of claim 1, wherein said parallel conductive traces and said parallel shear channel traces are parallel across said dielectric layer for providing shear force sensitivity in a single direction.

3. The capacitive force sensor of claim 1, further comprises a first region and a second region, wherein said parallel conductive traces and said parallel shear channel traces in said first region are orthogonal to said parallel conductive traces and said parallel shear channel traces in said second region, wherein said parallel shear channel traces and said parallel conductive traces in said first region and said second region are configured to provide shear force sensitivity in two orthogonal directions.

4. The capacitive force sensor of claim 1, further comprising four quadrants, wherein said parallel conductive traces and said parallel shear channel traces in a first said quadrant and a second said quadrant are orthogonal to said parallel conductive traces and said parallel shear channel traces in a third said quadrant and a fourth said quadrant, wherein said parallel shear channel traces and said parallel conductive traces in said four quadrants are configured to provide shear force sensitivity in two orthogonal directions and torsion sensitivity about a single axis.

5. The capacitive force sensor of claim 1, further comprising:
    a) a third support layer;
    b) a second dielectric layer, wherein said second dielectric layer is disposed between said second support layer and said third support layer, wherein said second dielectric layer comprises a deformable and non-conductive material forming a patterned structure having gaps;
    c) a conductive ground layer disposed between and bonded to said third support layer and said second dielectric layer; and
    d) a conductive layer of normal taxel traces having two distinct channels disposed between and bonded to said second dielectric layer and said second support layer; wherein said normal taxel traces are configured to provide capacitive force measurements having sensitivity in a normal direction for measuring a force component (Fz) and two moment and torque components (Mx, My).

* * * * *